Aug. 12, 1969  G. KOPP  3,460,763
VARIABLE-AREA NOZZLE
Filed April 12, 1967  6 Sheets-Sheet 1

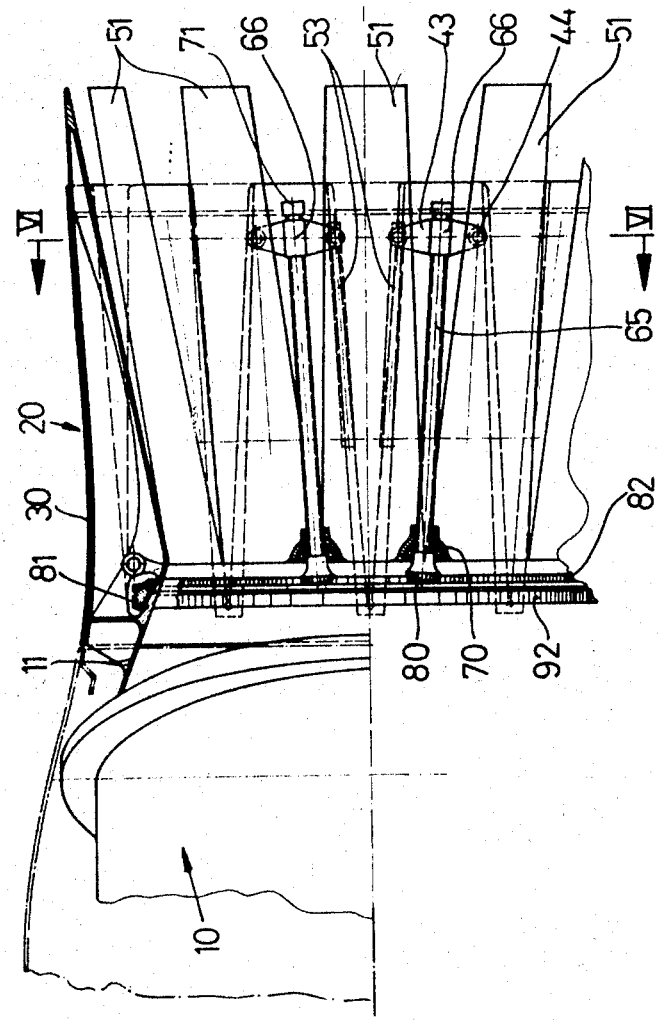

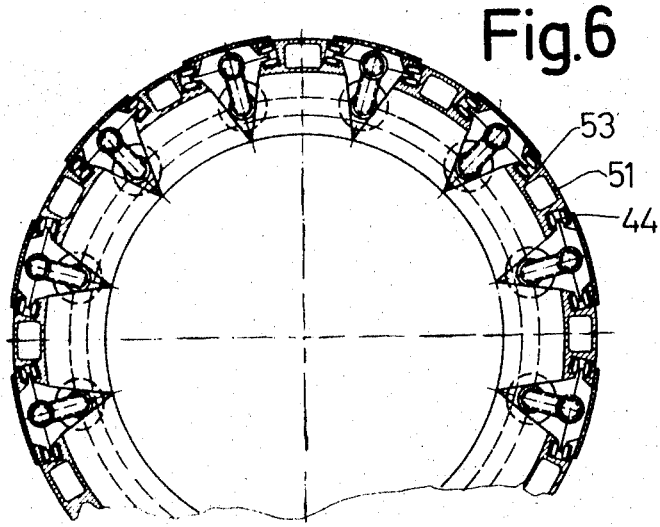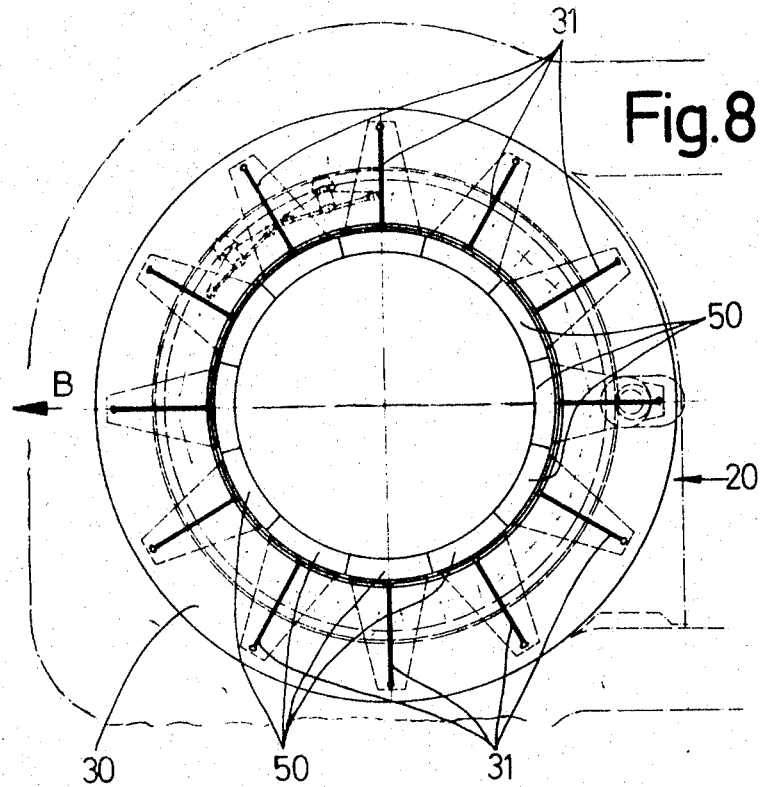

Aug. 12, 1969　　　G. KOPP　　　3,460,763
VARIABLE-AREA NOZZLE
Filed April 12, 1967　　　6 Sheets-Sheet 6

United States Patent Office 3,460,763
Patented Aug. 12, 1969

3,460,763
VARIABLE-AREA NOZZLE
Gerhard Kopp, Munich, Germany, assignor to Entwicklungsring Sud G.m.b.H., Munich, Germany, a corporation of Germany
Filed Apr. 12, 1967, Ser. No. 630,414
Claims priority, application Germany, Apr. 28, 1966, E 31,552
U.S. Cl. 239—265.43                                6 Claims

ABSTRACT OF THE DISCLOSURE

An afterburner nozzle having a spring steel outer shell having a plurality of longitudinal slots, an inner shell located within said outer shell, tension bands limiting the expansion of shells and motor operated spindles for adjusting the diameters of said bands.

This invention relates generally to variable-area nozzles and more particularly to variable nozzles for use with jet engines of supersonic aircraft.

Jet engines of supersonic aircraft are conventionally equipped with afterburners, the exhaust nozzles of which have a conical outer form. The required flight characteristics of supersonic aircraft is accomplished by the installation of afterburner nozzles with variable area. The distance between the inner and outer shells of such nozzles should be as small as possible in order to allow designs with favorable outer angles of inclination.

This invention has as its objective to provide a variable-area nozzle intended for jet engines of supersonic aircraft having a nozzle shell consisting of flexibly mounted, expandable truncated cone shell preferably made of spring steel, peripherally arranged adjusting spindles which interact with an area actuating mechanism which varies the nozzle area. Near the spherical bearings of the adjusting spindles, articulated gears are provided which are actuated jointly by a gear rim having inner spherical toothing.

The area actuating mechanisms interacting with the adjusting spindles consist of tension bands which are wound off and on by means of the adjusting spindles. Also provided are actuating mechanisms adjustable in the longitudinal direction of the nozzles by means of adjusting spindles. In the latter case the adjusting spindles take the form of jack screws having longitudinally adjustable screw nuts, on which rollers or sliding mechanisms are arranged to interact with a corresponding wedge surface of the nozzle wall sections.

A further objective of this invention is to provide an adjustable nozzle which has efficient means to vary nozzle area.

These and other objects of the invention will become more apparent to those skilled in the art by reference to the following detailed description when viewed in light of the accompanying drawings, wherein:

FIGURE 5 is a side elevation of another embodiment of the invention in which the nozzle area is varied by means of jack screws and wedge surfaces;

FIGURE 6 is a sectional view along the line VI—VI of FIGURE 5;

FIGURE 8 is a nozzle according to FIGURE 7, seen in direction of flight, i.e. in direction of arrow B in FIGURE 7.

Referring with more particularity to the drawings wherein like numerals indicate like elements, a nozzle 20 is arranged on a swiveling nozzle generally designated as 10. The nozzle 20 includes a conical sheet-metal shell 30 made of spring steel having axial slots 31 allowing the expansion of this sheet-metal shell within the range of the slots. The expansion of a finger-type shell is caused by an excess pressure of the engine exhaust gases, as shown in the configurations according to FIGURES 1 to 4 whereby an opening or enlarging of the nozzle area is possible to the degree allowed by the tension bands 41 and 42.

Figure 1:
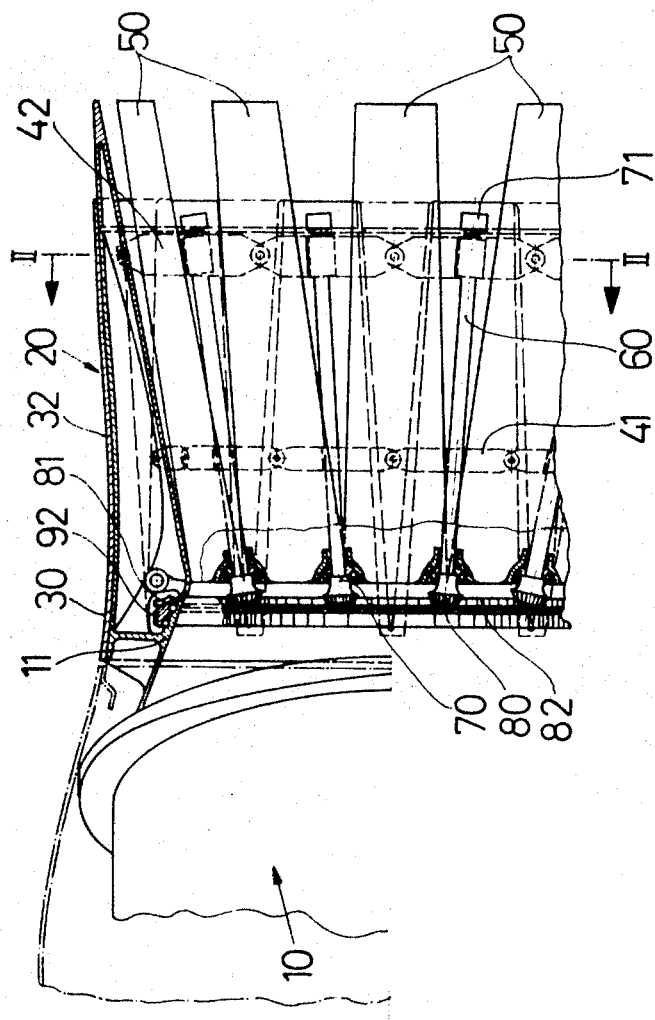
FIGURE 1 is a side elevation view of a nozzle with portions broken away.
Figure 2:
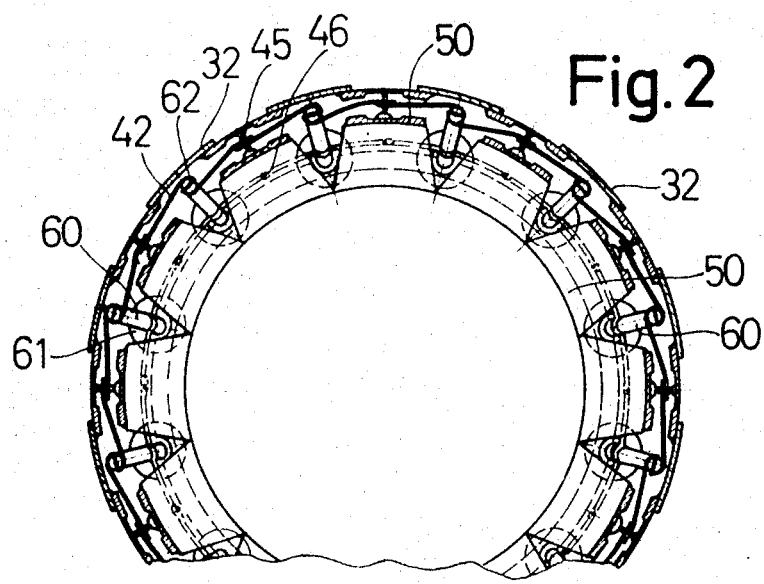
FIGURE 2 is a sectional view along the line II—II of FIGURE 1.
Figure 4:
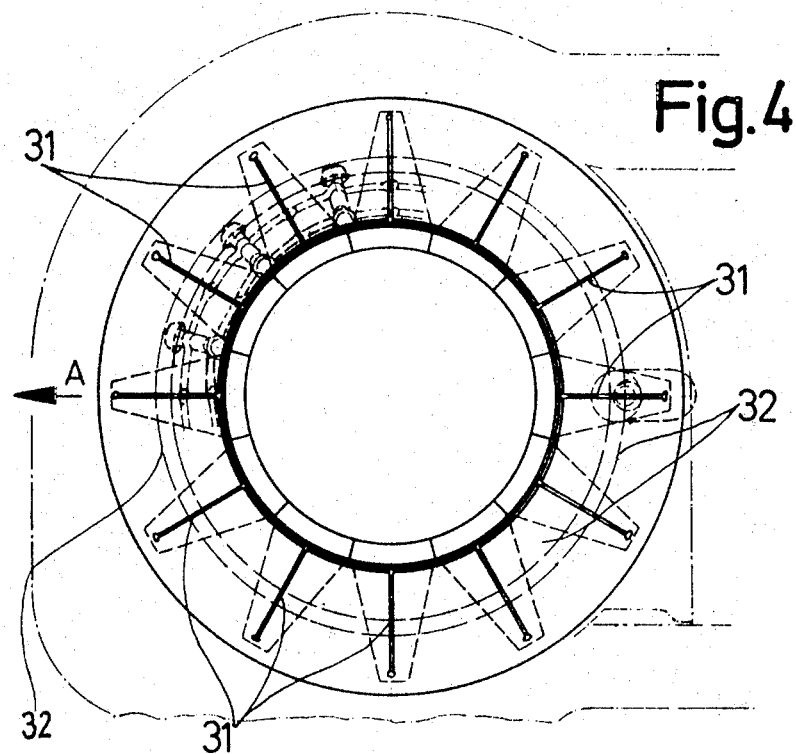
FIGURE 4 is a view of the nozzle of FIGURE 3 as seen in the direction of flight, i.e. in direction of arrow A in FIGURE 3.
Figure 3:
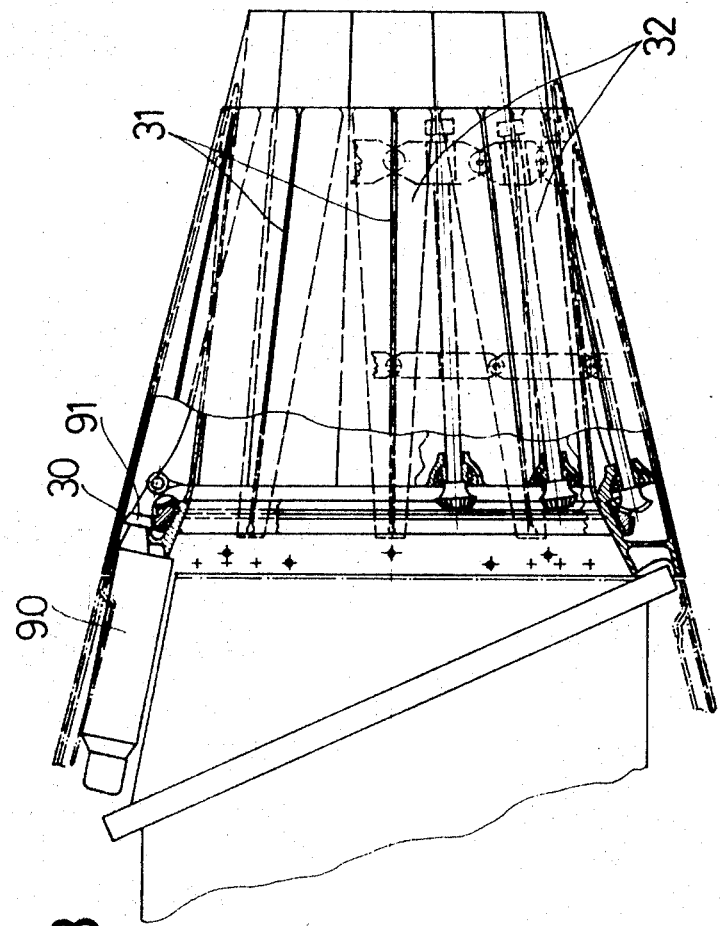
FIGURE 3 is a plan view of the nozzle of FIGURE 1 with the nozzle area reduced to the minimum.
Figure 7:
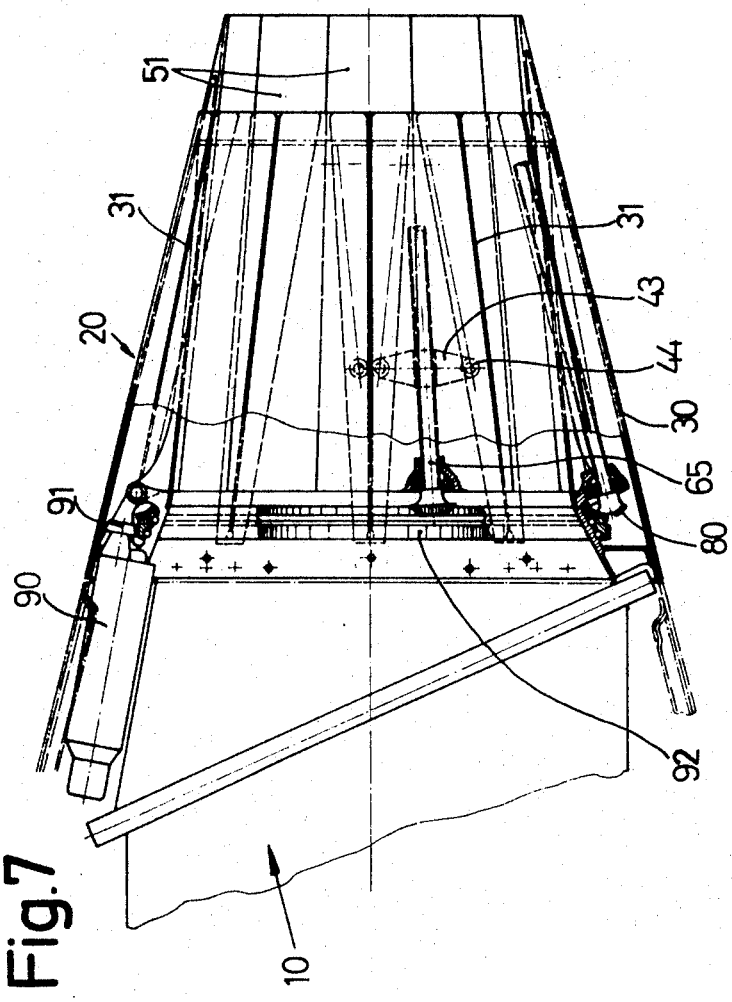
FIGURE 7 is a plan view of the nozzle of FIGURE 5 in which the nozzle area is reduce to the minimum.

The tension bands 41 and 42 are respectively fixed at joints 45 and 46 and are arranged in the inner sector 50 of the nozzle shell and can be wound on and off the jack screws 60. For this purpose the jack screws 60 have respectively slots 61 and 62 through which the tension bands 41 and 42 are passed. Each jack screw is supported by an articulated bearing 70 located near the front of the nozzle and by a bearing 71 at the rear. The screws are rotated through spherical gears 80 by a joint gear rim 82. The gear rim 82 is hinged by means of a bearing 81 on part 11 of the swiveling nozzle 10. The rim 82 as best seen in FIGURE 3 is actuated by one or several motors 90 via a gear 91 which engages with a gear rim 92 which is coaxially arranged to gear rim 82.

For reasons of expediency the motors should be connected to various driving systems, so that in the event of a failure of, for example, an air system, a hydraulic or electrical system remains in operation. The same applies to several driving systems of the same type, e.g. several hydraulic, electrical or air systems, so that, in the event of the failure of one of these systems, it is still guaranteed that the nozzle can be varied by means of a motor actuator.

The gear rims 82 and 92 are rigidly linked with each other. Therefore, rotation of the motor 90 in one direction or the other will rotate the adjusting spindles 60 accordingly and either reduce the area opening of the nozzle 20 by wrapping an increased amount of bands about the spindles or increase the area by unwrapping so as to permit increase or expansion.

Instead of the two gear rims 82 and 92 a single gear rim 82 may be used which is so designed that the pinions of the actuators 90 are directly engaged to the gear rim 82.

The embodiment according to FIGURES 5, 6, 7 and 8 is provided with nuts 66 and jack screws 65 as the actuating mechanisms longitudinally move the sliding mechanisms 43. The inner sectors 51 of the nozzle shell are expanded or drawn together, preferably by means of rollers 44 which glide along a corresponding sliding track 53. Here again the excess pressure prevailing in the nozzle will facilitate the spreading of the nozzle and the corresponding movement of the sliding mechanisms 43, whereas the elastic outer shell 30, 32 of the nozzle 20 will support the increase movement of the nozzle and the sliding mechanisms for reducing the nozzle area. Corresponding to the designs shown in FIGURES 1 to 4, the adjusting spindles 65 are supported at the front by an articulated bearing 70 and at the rear by a bearing 71.

Since the sliding tracks 53 on the sectors 51 of the inner nozzle shell are arranged in such a manner that the space between them tapers to a wedge form at the front (as seen in flight direction), an opening or closing of the nozzle is caused by the movement of the sliding mechanisms 43.

I claim:
1. A variable area nozzle comprising a spring steel truncated cone having a plurality of slots dividing said cone into fingers and arranged to receive the exhaust fumes of a jet engine in a manner to urge said fingers outwardly from their inwardly directed conical shape, band means fixedly attached to each finger to limit the extent of the outward movement of said fingers and actuating means comprising rotatable spindles disposed in each slot and attached at one end to said band means, and gear means at the other end of each of said spindles for engagement with drive means for rotatably driving said spindles and shortening and lengthening said band means by winding said band means on and off of each of said spindles thereby varying the nozzle area.

2. The nozzle according to claim 1 wherein said drive means includes a motor and a rim gear driven by said motor and gear means on each of said spindles, said rim gear in engagement with said gear means for rotatably driving said spindles.

3. The nozzle according to claim 2 characterized by the fact that the guide surfaces or sliding tracks on the inner wall of the individual fingers of the nozzle taper off in a wedge form towards the front, in the direction of flight.

4. A variable area nozzle comprising a spring steel truncated cone having a plurality of slots dividing said cone into fingers and arranged to receive the exhaust fumes of a jet engine in a manner to urge said fingers outwardly from their inwardly directed conical shape, actuating means to limit the extent of the outward movement of said fingers, said actuating means comprising an adjusting spindle in each slot adjustable in the axial direction and means coacting with each spindle for slidably engaging said fingers.

5. The nozzle according to claim 4 characterized by the fact that adjusting spindles are provided as jack screws interacting with finger engaging means.

6. The nozzle according to claim 5 characterized by the fact that the finger engaging means comprise screw nuts engaging said spindles, said screw nuts being provided with rollers interacting with guide surfaces arranged on the inner wall of the individual fingers.

References Cited

UNITED STATES PATENTS 2,472,949 6/1949 Jackson _____ 239—265.43
2,603,062 7/1952 Weiler et al. _____ 239—265.43

EVERETT W. KIRBY, Primary Examiner

U.S. Cl. X.R.

239—265